(12) United States Patent
BenHanokh et al.

(10) Patent No.: US 12,699,590 B2
(45) Date of Patent: Aug. 4, 2026

(54) ADJUSTING A STORAGE SYSTEM PARAMETER USING A CONTAINER IMAGE TO MEET A PERFORMANCE OBJECTIVE

(71) Applicant: Red Hat, Inc., Raleigh, NC (US)

(72) Inventors: Gabriel Zvi BenHanokh, Ra'anana (IL); Yehoshua Salomon, Ra'anana (IL); Orit Wasserman, Ra'anana (IL)

(73) Assignee: Red Hat, Inc., Raleigh, NC (US)

( * ) Notice: Subject to any disclaimer, the term of this patent is extended or adjusted under 35 U.S.C. 154(b) by 734 days.

(21) Appl. No.: 18/069,039

(22) Filed: Dec. 20, 2022

(65) Prior Publication Data

US 2024/0202022 A1 Jun. 20, 2024

(51) Int. Cl.
*G06F 9/48* (2006.01)
*G06F 9/455* (2018.01)

(52) U.S. Cl.
CPC .. *G06F 9/4881* (2013.01); *G06F 2009/45579* (2013.01)

(58) Field of Classification Search
CPC ......... G06F 9/4881; G06F 2009/45579; G06F 9/45558
See application file for complete search history.

(56) References Cited

U.S. PATENT DOCUMENTS

| | | | |
|---|---|---|---|
| 7,246,254 B2 | 7/2007 | Alur et al. | |
| 9,888,067 B1 | 2/2018 | Yemini et al. | |
| 10,346,216 B1 | 7/2019 | Yang et al. | |
| 10,417,065 B2 | 9/2019 | Ambichl et al. | |
| 10,516,582 B2 | 12/2019 | Wright et al. | |
| 10,599,340 B1 * | 3/2020 | Gudipati | G06F 13/18 |
| 11,025,495 B1 | 6/2021 | Bhatnagar et al. | |
| 11,032,161 B2 | 6/2021 | Bentley et al. | |
| 11,699,186 B1 * | 7/2023 | Seymour | G06Q 20/389 705/37 |
| 12,190,144 B1 * | 1/2025 | Featonby | H04L 67/568 |
| 2018/0349168 A1 * | 12/2018 | Ahmed | G06F 9/45558 |
| 2019/0065253 A1 * | 2/2019 | Bernat | G06F 9/50 |
| 2020/0034460 A1 * | 1/2020 | Tonnesen | G06F 16/217 |
| 2021/0133041 A1 * | 5/2021 | Ugale | G06F 12/0866 |
| 2021/0216215 A1 * | 7/2021 | Wigmore | G06F 9/542 |
| 2021/0318960 A1 * | 10/2021 | Mallick | G06F 12/0882 |
| 2021/0373815 A1 * | 12/2021 | Kumar | G06F 3/067 |

OTHER PUBLICATIONS

Bentaleb et al., "Containerization technologies: taxonomies, applications and challenges," The Journal of Supercomputing, vol. 78, Jun. 8, 2021: pp. 1144-1181, <https:/link.springer.com/article/10.1007/S11227-021-03914-1>.

* cited by examiner

*Primary Examiner* — Dong U Kim
(74) *Attorney, Agent, or Firm* — Kilpatrick Townsend & Stockton LLP

(57) ABSTRACT

A parameter for a storage system can be adjusted using a container image to meet a performance objective according to some aspects described herein. For example, a scheduler of a control plane can determine the performance objective for a container scheduled by the control plane by using a container image of the container. The performance objective can be associated with a software application of the container. Based on the performance objective, the control plane can tag an IO request of the container with an IO tag. The scheduler can cause an adjustment to the parameter for the storage system based on the IO tag for the IO request.

17 Claims, 3 Drawing Sheets

200

300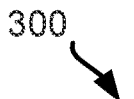

```
┌─────────────────────────────────────────────────┐
│                       302                         │
│   Determine, by a scheduler of a control plane, a │
│ performance objective for a container scheduled by the│
│   control plane, the performance objective being  │
│  associated with a software application of the container│
│   and determinable using a container image of the │
│                    container                      │
└─────────────────────────────────────────────────┘
                         │
                         ▼
┌─────────────────────────────────────────────────┐
│                       304                         │
│ Tag, by the control plane, an IO request of the container│
│   with an IO tag based on the performance objective│
└─────────────────────────────────────────────────┘
                         │
                         ▼
┌─────────────────────────────────────────────────┐
│                       306                         │
│   Cause an adjustment to a parameter for a storage│
│   system based on the IO tag for the IO request of the│
│                    container                      │
└─────────────────────────────────────────────────┘
```

*FIG. 3*

ADJUSTING A STORAGE SYSTEM PARAMETER USING A CONTAINER IMAGE TO MEET A PERFORMANCE OBJECTIVE

TECHNICAL FIELD

The present disclosure relates generally to performance objectives for computing environments. More specifically, but not by way of limitation, this disclosure relates to adjusting a storage system parameter using a container image to meet a performance objective.

BACKGROUND

Containers are relatively isolated virtual-environments in a computing environment that are typically deployed from image files, which are referred to herein as container images. A container image can be a static binary file that includes all of the requirements for running a container. Container images can include a compiled version of a software application as well as system libraries and operating system settings. Data for the software application can be read from and written to a storage system, which may include one or more storage devices.

An administrator can configure parameters for the software application based on system applications that are running in the computing environment. The parameters can be configured to meet certain performance objectives for each client associated with a respective container in the computing environment. The computing environment can be a software-defined system that uses software to virtualize components, such as a container configuration, of the computing environment.

BRIEF DESCRIPTION OF THE DRAWINGS

FIG. 3 is a flowchart of a process for adjusting a parameter of a storage system using a container image to meet a performance objective according to one example of the present disclosure.

DETAILED DESCRIPTION

Figure 1:
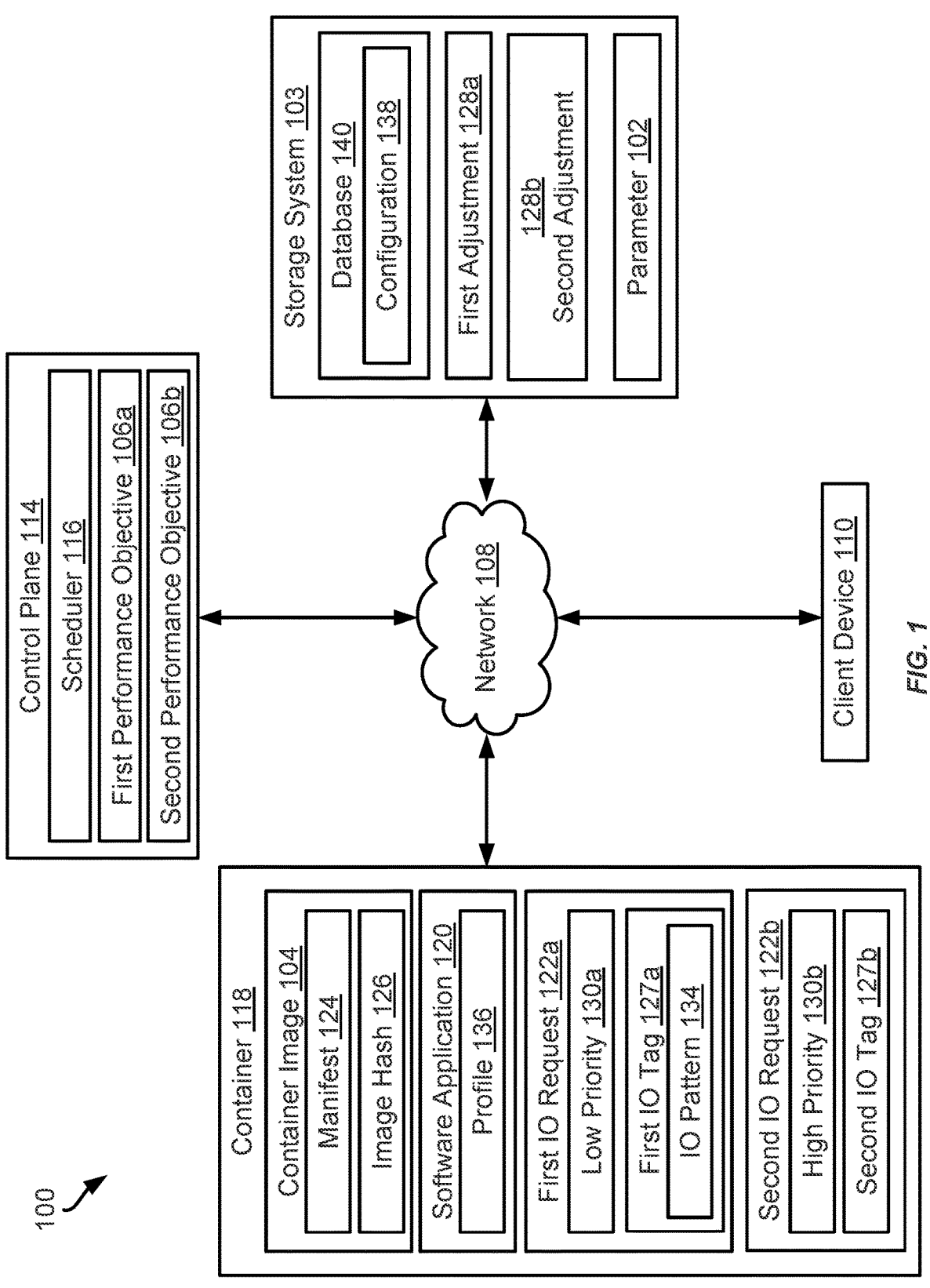
FIG. 1 is a block diagram of an example of a computing environment for adjusting a parameter of a storage system using a container image to meet a performance objective according to one example of the present disclosure.

An entity (e.g., a user, a client, or an administrator) can deploy a software application of a container to a computing environment hosted by a service provider. For the software application to properly function once deployed in the computing environment, the entity may need to configure the computing environment beforehand to handle the software application correctly such that certain performance objectives are met. But knowing ahead of time how to configure parameters in the computing environment such that the software application meets the performance objectives can be challenging. These technical details may not be provided with the software application because the technical details are highly variable, in that the technical details depend on a specific configuration for the software application and characteristics of a specific computing environment to which the software application is deployed. For example, a specific software application may have different performance objectives in different computing environments hosted by different service providers. Other software applications running concurrently in the computing environment may affect performance objectives for the software application. Additionally, the container may have different performance objectives that sometimes can conflict with each other. These factors can make it challenging for the entity to preconfigure the parameters in the computing environment to handle the software application.

Some examples of the present disclosure can overcome one or more of the issues mentioned above by providing a computing environment that can use a container image to adjust a parameter of storage system to meet or exceed a performance objective. The container image can provide requirements, including computing parameter requirements, for running the container that includes the software application in a computing environment. Based on the container image, the computing environment can identify a performance objective for a container containing the software application. The computing environment can then tag an IO request of the container with an IO tag that is generated based on the performance objective. The IO request can involve requests (e.g., read/write requests) issued by the software application to implement computing processes associated with the software application. Using the IO tag for the IO request, the computing environment can cause an adjustment to the parameter of the storage system based on the performance objective for the container. Using these techniques, the parameter can be automatically adjusted to meet or exceed the performance objective for the container associated with the software application. Meeting the performance objective may ensure proper operation of the software program and may prevent draining limited computing resources.

In one particular example, a computing environment can include a client device and a storage system. The client device can be used to deploy a software application that is stored in a container to the computing environment. To determine a configuration for the software application once deployed in the computing environment, a control plane in the computing environment associated with scheduling the container may use a container image of the container to identify a performance objective associated with the software application. After identifying the performance objective, the control plane can apply an IO tag to an IO request of the container. The IO tag can be generated based on the performance objective and can include information used to identify one or more adjustments to the storage system. For example, the control plane may identify an adjustment to a parameter associated with the storage system using the IO tag such that the software application meets the performance objective. The storage system can cause the adjustment to the parameter after the adjustment is identified. Additionally or alternatively, the IO tag may indicate the performance objective associated with a tagged IO request.

In some examples, a scheduler in the control plane can analyze an image identifier of a container image. For example, a client device can use the container image to build a container with software application A. Based on the image identifier for the container image, the scheduler can determine that the container includes software application A. After determining that the software application included in the container is software application A, the scheduler can identify the performance objective for the container associated with software application A. The control plane then can determine the adjustment to the storage system (e.g., adjusting a parameter for the storage system) such that a specific performance objective is met. For example, if the performance objective involves increasing throughput, the storage system can adjust the queue size to meet the performance objective.

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

FIG. 1 is a block diagram of an example of a computing environment 100 for adjusting a parameter 102 of a storage system 103 using a container image 104 to meet a performance objective 106 according to one example of the present disclosure. The computing environment 100 may be a software-defined system or a hardware-defined system. Components within the computing environment 100 may be communicatively coupled via a network 108, such as a local area network (LAN), wide area network (WAN), the Internet, or any combination thereof. For example, the computing environment 100 can include a client device 110, a control plane 114, and the storage system 103 that are communicatively coupled through the network 108. Examples of the client device 110 can include a laptop computer, desktop computer, mobile phone, or tablet. The control plane 114 and the storage system 112 may be part of a container-orchestration system, such as Kubernetes. In some examples, functions associated with the control plane 114 can include participating in routing protocols, configuring settings associated with processing data requests, or other suitable tasks related to handling data processing. The container-orchestration system can manage and run containers in the computing environment 100. In such examples, a scheduler 116 of the control plane 114 can be a kubelet.

In some examples, the computing environment 100 can include the scheduler 116 to execute a container 118 that includes a software application 120. If the containers or other suitable computing devices in the computing environment 100 are undergoing a provisioning process, the scheduler 116 can be referred to as a provisioner or an orchestrator. Additionally or alternatively, the client device 110 may use the container image 104 to build the container 118 with the software application 120. The container 118 can be deployed from the container image 104 that includes a compiled version of the software application 120 as well as system libraries and operating system settings. The container 118 is depicted in FIG. 1 as including the container image 104, but the container 118 may be built from the container image 104 and not include the container image 104. In some examples, an input/output (IO) request 122 (e.g., a read/write request, an open/close request, etc.) of the container 118 can be associated with an IO stream for the software application 120. In some examples, more than one IO request of the container 118 may be associated with the IO stream for the software application 120. For example, the software application 120 may generate more than one IO request 122 such that a respective IO stream is associated with more than one IO request 122. Additionally or alternatively, data (e.g., information used to process an IO request 122) associated with the software application 120 can be stored in a cache of the storage system 103.

Based on a container type associated with the container 118 or an application type associated with the software application 120, the scheduler 116 can identify the performance objective 106 for the software application 120. Examples of the container type can include application containers, pet containers, super privileged containers, system containers, or the like. Examples of the application type can include application software, system software, programming software, or the like. In some examples, the scheduler 116 can use a manifest 124 of the container image 104 to identify the performance objective 106 by determining the software application 120 of the container 118. The manifest 124 can provide information about layers and architectures of the container image 104, which can be used to identify the software application 120, the performance objective 106, or a combination thereof. Additionally or alternatively, the scheduler 116 may use an image hash 126 of the container image 104 to identify the performance objective 106. As another example, the scheduler 116 may use a machine-learning model trained on historical container images and associated software applications to determine the container type, the application type, or a combination thereof.

In some examples, the performance objective 106 can be associated with the container 118 as a whole. Additionally or alternatively, each IO request 122 for the container 118 may be associated with a respective performance objective. The control plane 114 can tag each IO request 122 or each IO stream with a respective IO tag based on the respective performance objective. Additionally or alternatively, the control plane 114 may tag each container 118 in the computing environment 100 with a respective IO tag based on the respective performance objective. The performance objective 106 may involve throughput, latency, bandwidth, response time, a read/write ratio, or the like. Latency can be further specified with respect to maximum latency or average latency. To meet or exceed the performance objective 106 for the software application 120, the control plane 114 can use an IO tag 127 associated with the IO request 122 to identify an adjustment 128 for the storage system 103. For example, the adjustment 128 can include adjusting at least one parameter 102 for the storage system 103. To apply the adjustment, the control plane 114 can transmit an indication of the adjustment 128 to the storage system 103.

In some examples, the control plane 114 may transmit the IO tag 127 to the storage system 103, causing the storage system 103 to adjust the parameter 102. For example, the storage system 103 may determine the adjustment 128 based on the IO tag 127. The IO tag may indicate the performance objective 106 for the container 118 or the adjustment 128 of the parameter 102. The adjustment 128 of the parameter 102 may be associated with the storage system 103, or the adjustment 128 may additionally or alternatively be associated with the client device 110 or another suitable computing device in the computing environment 100. Examples of the parameter 102 can include cache size, queue size, or an ability to reorder requests. For example, if the performance objective 106 involves the read/write ratio, the control plane 114 can determine the adjustment 128 to be associated with cache size to meet the performance objective 106. In such examples, the IO tag 127 can be associated with an increase to the cache size if the read/write ratio is relatively large, thereby enabling increased read operations. As an additional example, if the performance objective 106 involves maximum latency, the storage system 103 can buffer a predetermined number of read requests to meet the performance objective 106.

In some examples, the control plane 114 can consider the container 118 as a whole, other containers running in the computing environment 100, or a combination thereof to determine the adjustment 128 to the parameter 102. For example, the control plane 114 may consider each perfor- mance objective 106 for the container 118 to determine the parameter(s) 102 to adjust. As another example, the control plane 114 may determine a first adjustment 128a to the parameter 102 using a first IO tag 127a generated based on a first performance objective 106a for the software applica- tion 120 at a first time. At a second time after the first time, the control plane 114 can generate a second IO tag 127b based on a second performance objective 106b. The second performance objective 106b can be determined to replace the first performance objective 106a. Replacing the first performance objective 106a may occur due to different software applications that are running in the computing environment 100 at the second time compared to the first time. Accordingly, a second adjustment 128b of the param- eter 102 based on the second IO tag 127b can be applied to meet the second performance objective 106b. The parameter 102 may be automatically adjusted by the control plane 114 or by the storage system 103. Alternatively, adjusting the parameter 102 can be approved by a client associated with the client device 110 or another suitable user (e.g., a devel- oper or an administrator).

If more than one performance objective 106 is associated with the software application 120, the first performance objective 106a for the container may conflict with the second performance objective 106b for the container. The control plane 114 can balance conflicting performance objectives for the container based on priority 130. For example, the second performance objective 106b can be prioritized over the first performance objective 106a due to having a higher priority than the first performance objective 106a. In such examples, the second adjustment 128b for the parameter 102 can be determined based on the first IO tag 127a and the second IO tag 127b such that the parameter 102 is adjusted to prioritize the second performance objective 106b. The priority 130 for the performance objective 106 may be assigned based on the client associated with the software application 120. In some examples, the client can specify which performance objective 106 has higher priority 130 compared to other performance objectives. Additionally or alternatively, the priority 130 can be assigned to the performance objective 106 based on a specific client. For example, the first performance objective 106a may be assigned as low priority 130a due to being associated with a first client, while the second performance objective 106b may be considered high priority 130b due to being associ- ated with a second client.

In some examples, the control plane 114 can generate the IO tag 127 using the container image 104 to indicate an IO pattern 134 associated with the software application 120. Examples of the IO pattern 134 can be sequential access, semi-sequential access, random access, or semi-random access. The control plane 114 may transmit the IO tag 127 to the storage system 103, causing the parameter 102 asso- ciated with the storage system 103 to be adjusted based on the IO tag 127. In some examples, the storage system 103 can determine the adjustment 128 to the parameter 102 using the IO tag 127. Additionally or alternatively, the control plane 114 can identify the adjustment 128 that is applied by the storage system 103.

Adjusting individual parameters can be time-consuming or inefficient. As a result, the control plane 114 can imple- ment methods to adjust multiple parameters. In some examples, the control plane 114 can determine a profile 136 for the software application 120 that includes the at least one performance objective 106 for the container 118. Determin- ing the profile 136 can involve identifying the container type or the application type. For example, the control plane 114 may determine the profile 136 by using data stored in the container image 104 to query an image database for a match. The image database can include historic container images or current container images that the control plane 114 can reference to determine the profile 136.

Based on the profile 136, the control plane 114 can select a configuration 138 for the container 118 from a database 140 stored in the storage system 103 or another suitable storage device in the computing environment 100. Examples of storage devices can include hard disk drives, caches, or solid-state drives. The configuration 138 can include at least one adjustment 128 of a respective parameter that can be applied to meet one or more performance objectives 106 for the container 118. Implementing the configuration 138 can be a relatively efficient way to adjust multiple parameters to meet the performance objectives 106 for the container 118.

In some examples, the control plane 114 can use at least one lookup table to select the configuration 138. The lookup table can map input values to output values such that a lookup operation executed by the control plane 114 can retrieve corresponding output values in response to receiv- ing the input values. The input values can be data, such as the profile 136, associated with the container type or the application type, while the output values can be used to determine the configuration 138. In some examples, the lookup table may be generated to correspond to a specific container type or a specific application type, enabling the control plane 114 to determine a specific configuration for the specific container type or the specific application type.

Additionally or alternatively, selecting the configuration 138 can involve machine learning, which can be imple- mented using a machine-learning model in the control plane 114. Training data for the machine-learning model can include the historical container images and labels identifying associated configurations for the historical container images. Additionally, the training may include software applications associated with the historical container images. During training, the training data can be iteratively supplied to the machine-learning model to enable the machine-learning model to identify patterns related to the training data or to identify relationships between the training data and output data, such as the configuration 138.

While FIG. 1 depicts a specific arrangement of compo- nents, other examples can include more components, fewer components, different components, or a different arrange- ment of the components shown in FIG. 1. For instance, in other examples, the computing environment 100 may include multiple client devices. Additionally, any compo- nent or combination of components depicted in FIG. 1 can be used to implement the process(es) described herein.

Figure 2:
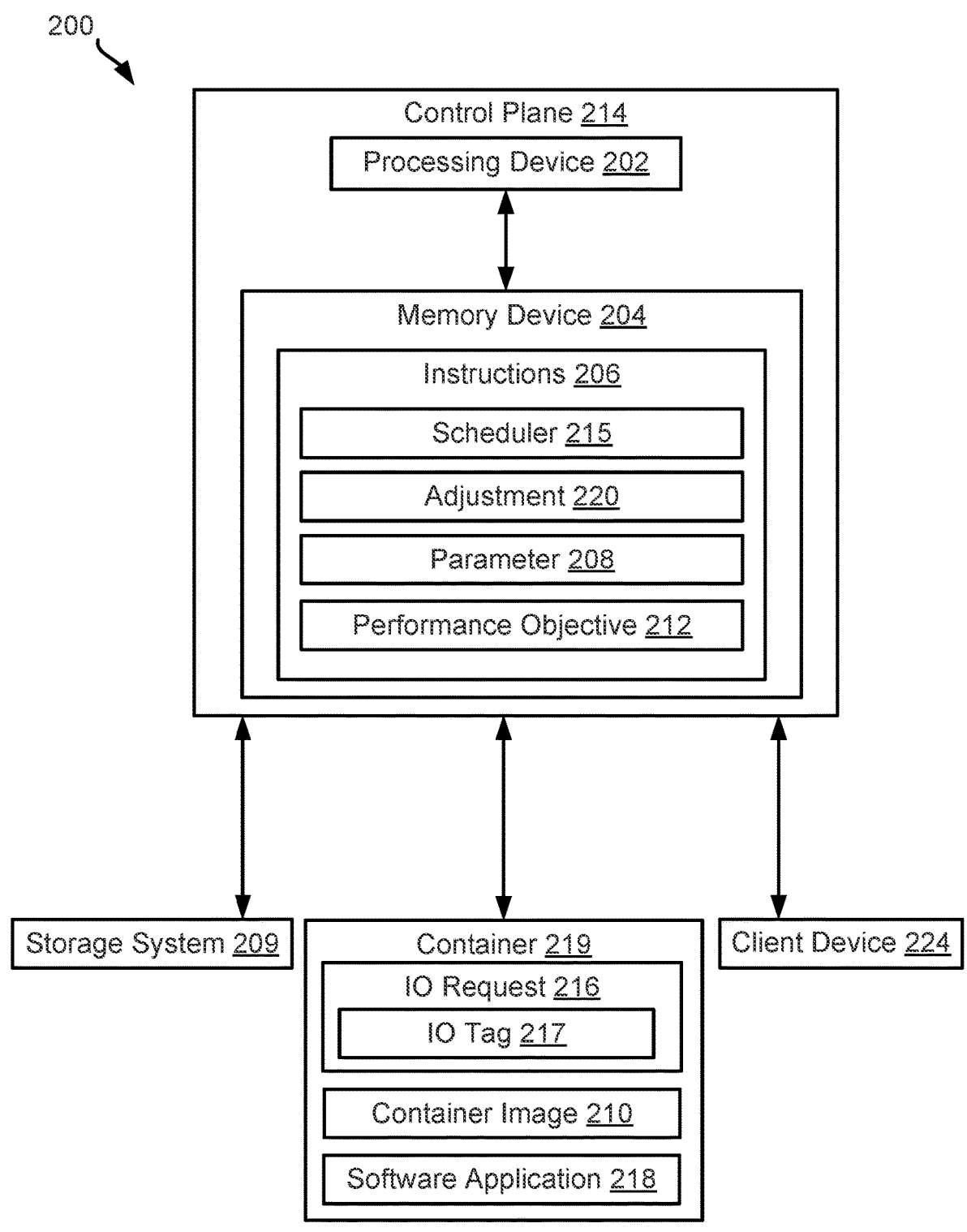
FIG. 2 is a block diagram of another example of a computing environment for adjusting a parameter of a storage system using a container image to meet a performance objective according to one example of the present disclosure.

FIG. 2 is a block diagram of another example of a computing environment 200 for adjusting a parameter 208 of a storage system 209 using a container image 210 to meet a performance objective 212 according to one example of the present disclosure. The computing environment 200 can include a processing device 202 communicatively coupled to a memory device 204. In some examples, the processing device 202 and the memory device 204 can be part of a control plane 214 or another suitable computing device in the computing environment 200.

The processing device 202 can include one processing device or multiple processing devices. Non-limiting examples of the processing device 202 include a Field-Programmable Gate Array (FPGA), an application-specific integrated circuit (ASIC), and a microprocessor. The processing device 202 can execute instructions 206 stored in the memory device 204 to perform operations. In some examples, the instructions 206 can include processor-specific instructions generated by a compiler or an interpreter from code written in any suitable computer-programming language, such as C, C++, C#, Java, Python, or any combination of these.

The memory device 204 can include one memory device or multiple memory devices. The memory device 204 can be non-volatile and may include any type of memory device that retains stored information when powered off. Non-limiting examples of the memory device 204 include electrically erasable and programmable read-only memory (EEPROM), flash memory, or any other type of non-volatile memory. At least some of the memory device 204 includes a non-transitory computer-readable medium from which the processing device 202 can read instructions 206. A computer-readable medium can include electronic, optical, magnetic, or other storage devices capable of providing the processing device 202 with the instructions 206 or other program code. Non-limiting examples of a computer-readable medium include magnetic disk(s), memory chip(s), ROM, random-access memory (RAM), an ASIC, a configured processing device, and optical storage.

In some examples, the processing device 202 can execute the instructions 206 to perform operations. For example, the processing device 202 can determine, by a scheduler 215 of the control plane 214, a performance objective 212 for a container 219 scheduled by the processing device 202. The performance objective 212 can be for an IO request 216 associated with a software application 218 of the container 219. Using the container image 210 of the container 219, the processing device 202 can determine the performance objective 212. For example, the processing device 202 can use a manifest (e.g., the manifest 124 of FIG. 1) or an image hash (e.g., the image hash 126 of FIG. 1) associated with the container image 210 to determine the performance objective 212. In some examples, a machine-learning model in the control plane 214 can be trained using historical container images and associated software applications to determine the performance objective 212 based on the container image 210.

Based on the performance objective 212, the processing device 202 can tag the IO request 216 using an IO tag 217 that is generated based on the performance objective 212. The IO tag 217 can contain information to indicate the performance objective 212 or an adjustment 220 to a parameter 208. Examples of the IO request 216 can include read/write requests, device IO control requests, or close requests. Based on the IO tag 217, a computing system, such as the storage system 209, in the computing environment 200 can determine the adjustment 220 to apply to the parameter 208 corresponding to the computing system. Additionally or alternatively, the processing device 202 can determine the adjustment 220 using the IO tag 217. In some examples, the processing device 202 can apply the adjustment 220 associated with the parameter 208 to the storage system 209 or to the client device 224. The adjustment 220 can enable the container 219 to meet the performance objective 212, thereby improving performance of the software application 218 and the container 219.

FIG. 3 is a flowchart of a process 300 for adjusting a parameter 208 of a storage system 209 using a container image 210 to meet a performance objective 212 according to one example of the present disclosure. In some examples, the processing device 202 can perform one or more of the steps shown in FIG. 3. In other examples, the processing device 202 can implement more steps, fewer steps, different steps, or a different order of the steps depicted in FIG. 3. The steps of FIG. 3 are described below with reference to components discussed above in FIG. 2.

At block 302, the processing device 202 determines, by a scheduler 215 of a control plane 214, the performance objective 212 for a container 219 scheduled by the control plane 214. For example, the scheduler 215 of the control plane 214 may determine that the performance objective 212 for the container 219 involves reducing average latency. The processing device 202 can use a container image 210 of the container 219 to determine the performance objective 212. For example, the scheduler 215 of the control plane 214 can be used to analyze a name of the container image 210. The name of the container image 210 can indicate application type or container type associated with the container image 210. For example, the scheduler 215 can identify that the software application 218 in the container 219 is system software, thereby enabling the scheduler 215 to determine the performance objective 212 in response to identifying the application type. Additionally or alternatively, the scheduler 215 can input the container image 210 into a machine-learning model that has been trained on historic container images and associated software applications. Based on training, the machine-learning model can use the container image 210 to output the performance objective 212.

At block 304, the processing device 202 tags, by the control plane 214, an IO request 216 of the container 219 with an IO tag 217 based on the performance objective 212. The IO request 216 can be generated by the software application to perform IO operations (e.g., read/write operations, open/close operations, etc.). A suitable computing system, such as the storage system 209, can apply an adjustment 220 of the parameter 208 based on the IO tag 217. In some examples, the processing device 202 can determine the adjustment 220 to meet the performance objective 212. Additionally or alternatively, the storage system 209 may determine the adjustment 220 using the IO tag 217 before applying the adjustment 220 to the parameter 208. The parameter 208 may be associated with the storage system 209, a client device 224, or another suitable computing device. Adjusting the parameter 208 can involve adjusting queue size, cache size, or the like. For example, decreasing the queue size can decrease latency, whereas increasing the queue size can increase throughput. Accordingly, if the performance objective 212 involves reducing average latency, the processing device 202 can adjust the queue size to reduce the average latency.

At block 306, the processing device 202 causes the adjustment 220 to the parameter 208 for the storage system 209 for the IO request 216. If the processing device 202 determines multiple adjustments, and a first adjustment 220a conflicts with a second adjustment 220b, the processing device 202 can adjust the parameter 208 based on priority (e.g., the priority 130 of FIG. 1) of the adjustment 220 or the performance objective 212. For example, if the first adjustment 220a involves increasing the queue size while the second adjustment 220b involves decreasing the queue size, the processing device 202 may determine a respective priority of each adjustment 220 before implementing the second adjustment 220b. After determining that the first adjustment 220a has a lower priority than the second adjustment 220b, the processing device 202 can implement the second adjustment 220b. A client associated with the client device 224 may assign the priority for the adjustment 220. If the first adjustment 220a is associated with a different client than the second adjustment 220b, the priority may be assigned based on a respective client for each adjustment 220.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A system comprising:
a processing device; and
a memory device including instructions that are executable by the processing device for causing the processing device to perform operations comprising:
determining, by a scheduler of a control plane and using a container image executable to deploy a container, a performance objective for the container scheduled by the control plane by:
providing, by the scheduler, the container image as an input to a machine-learning model trained on historical container images, wherein training data used to train the machine-learning model identifies software applications associated with the historical container images; and
receiving, from the machine-learning model, an output indicating the performance objective, the performance objective being associated with a software application of the container;
tagging, by the control plane, an input/output (IO) request of the container with an IO tag based on the performance objective;
determining, by the control plane and based on one or more other containers executing in a computing environment with the container, an adjustment to a parameter of a storage system to meet the performance objective associated with the container; and
causing the adjustment to the parameter for the storage system based on the IO tag for the IO request of the container.

2. The system of claim 1, wherein determining the performance objective for the container further comprises:
receiving the container image; and
identifying the performance objective for the container using a manifest of the container image, wherein the manifest of the container image comprises information corresponding to layers of the container image.

3. The system of claim 1, wherein the performance objective is a first performance objective corresponding to a first point in time and the adjustment is a first adjustment to the parameter based on a first IO tag, and wherein the operations further comprise:
determining, based on different software applications executing at a second point in time compared to the first point in time, a second performance objective for the container, wherein the second performance objective replaces the first performance objective;
subsequent to determining the second performance objective, tagging the IO request of the container with a second IO tag based on the second performance objective; and
causing a second adjustment to the parameter based on the second IO tag.

10

4. The system of claim 1, wherein the performance objective is a first performance objective and the adjustment is a first adjustment to the parameter based on a first IO tag associated with a first IO request, and wherein the operations further comprise:
determining a second performance objective for the container, wherein the second performance objective is associated with a higher priority than the first performance objective;
tagging a second IO request of the container with a second IO tag based on the second performance objective; and
causing a second adjustment to the parameter based on the first IO tag and the second IO tag, wherein the parameter is adjusted to prioritize the second IO tag.

5. The system of claim 1, wherein tagging the IO request of the container with the IO tag based on the performance objective further comprises:
generating the IO tag indicating an IO pattern associated with the software application of the container, wherein the IO tag is determinable using the container image of the container; and
transmitting the IO tag to the storage system, wherein the parameter for the storage system is adjustable based on the IO tag.

6. The system of claim 1, wherein the operations further comprise:
determining a profile for the software application, wherein the profile comprises the performance objective for the container;
selecting a configuration for the container from a database in the storage system based on the profile, wherein the configuration comprises the adjustment of the parameter; and
applying the configuration to the container.

7. A method comprising:
determining, by a scheduler of a control plane and using a container image executable to deploy a container, a performance objective for the container scheduled by the control plane by:
providing, by the scheduler, the container image as an input to a machine-learning model trained on historical container images, wherein training data used to train the machine-learning model identifies software applications associated with the historical container images; and
receiving, from the machine-learning model, an output indicating the performance objective, the performance objective being associated with a software application of the container;
tagging, by the control plane, an IO request of the container with an IO tag based on the performance objective;
determining, by the control plane and based on one or more other containers executing in a computing environment with the container, an adjustment to a parameter of a storage system to meet the performance objective associated with the container; and
causing the adjustment to the parameter for the storage system based on the IO tag for the IO request of the container.

8. The method of claim 7, wherein determining the performance objective for the container further comprises:
receiving the container image; and
identifying the performance objective for the container using a manifest of the container image, wherein the manifest of the container image comprises information corresponding to layers of the container image.

9. The method of claim 7, wherein the performance objective is a first performance objective corresponding to a first point in time and the adjustment is a first adjustment to the parameter based on a first IO tag, and wherein the method further comprises:

determining, based on different software applications executing at a second point in time compared to the first point in time, a second performance objective for the container, wherein the second performance objective replaces the first performance objective;

subsequent to determining the second performance objective, tagging the IO request of the container with a second IO tag based on the second performance objective; and causing a second adjustment to the parameter based on the second IO tag.

10. The method of claim 7, wherein the performance objective is a first performance objective and the adjustment is a first adjustment to the parameter based on a first IO tag associated with a first IO request, and wherein the method further comprises:

determining a second performance objective for the container, wherein the second performance objective is associated with a higher priority than the first performance objective;

tagging a second IO request of the container with a second IO tag based on the second performance objective; and causing a second adjustment to the parameter based on the first IO tag and the second IO tag, wherein the parameter is adjusted to prioritize the second IO tag.

11. The method of claim 7, wherein tagging the IO request of the container with the IO tag based on the performance objective further comprises:

generating the IO tag indicating an IO pattern associated with the software application of the container, wherein the IO tag is determinable using the container image of the container; and transmitting the IO tag to the storage system, wherein the parameter for the storage system is adjustable based on the IO tag.

12. The method of claim 7, further comprising:

determining a profile for the software application, wherein the profile comprises the performance objective for the container;

selecting a configuration for the container from a database in the storage system based on the profile, wherein the configuration comprises the adjustment of the parameter; and applying the configuration to the container.

13. A non-transitory computer-readable medium comprising program code executable by a processing device for causing the processing device to perform operations comprising:

determining, by a scheduler of a control plane and using a container image executable to deploy a container, a performance objective for the container scheduled by the control plane by:

providing, by the scheduler, the container image as an input to a machine-learning model trained on historical container images, wherein training data used to train the machine-learning model identifies software applications associated with the historical container images; and receiving, from the machine-learning model, an output indicating the performance objective, the performance objective being associated with a software application of the container;

tagging, by the control plane, an input/output (IO) request of the container with an IO tag based on the performance objective;

determining, by the control plane and based on one or more other containers executing in a computing environment with the container, an adjustment to a parameter of a storage system to meet the performance objective associated with the container; and causing the adjustment to the parameter for the storage system based on the IO tag for the IO request of the container.

14. The non-transitory computer-readable medium of claim 13, wherein determining the performance objective for the container further comprises:

receiving the container image; and identifying the performance objective for the container using a manifest of the container image, wherein the manifest of the container image comprises information corresponding to layers of the container image.

15. The non-transitory computer-readable medium of claim 13, wherein the performance objective is a first performance objective corresponding to a first point in time and the adjustment is a first adjustment to the parameter based on a first IO tag, and wherein the operations further comprise:

determining, based at least in part on different software applications executing at a second point in time compared to the first point in time, a second performance objective for the container, wherein the second performance objective replaces the first performance objective;

subsequent to determining the second performance objective, tagging the IO request of the container with a second IO tag based on the second performance objective; and causing a second adjustment to the parameter based on the second IO tag.

16. The non-transitory computer-readable medium of claim 13, wherein the performance objective is a first performance objective and the adjustment is a first adjustment to the parameter based on a first IO tag associated with a first IO request, and wherein the operations further comprise:

determining a second performance objective for the container, wherein the second performance objective is associated with a higher priority than the first performance objective;

tagging a second IO request of the container with a second IO tag based on the second performance objective; and causing a second adjustment to the parameter based on the first IO tag and the second IO tag, wherein the parameter is adjusted to prioritize the second IO tag.

17. The non-transitory computer-readable medium of claim 13, wherein tagging the IO request of the container with the IO tag based on the performance objective further comprises:

generating the IO tag indicating an IO pattern associated with the software application of the container, wherein the IO tag is determinable using the container image of the container; and transmitting the IO tag to the storage system, wherein the parameter for the storage system is adjustable based on the IO tag.

* * * * *